Figure 4:
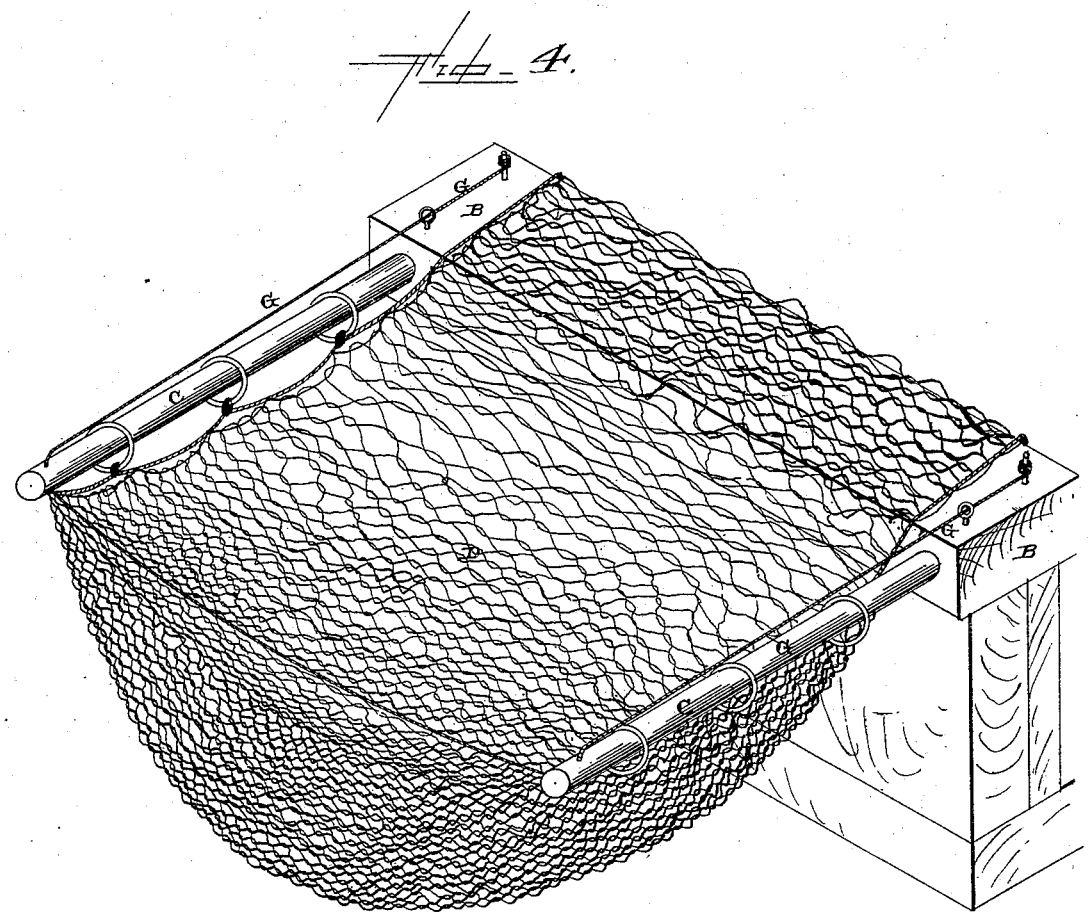

(No Model.) 2 Sheets—Sheet 1.
G. M. McCLAIN.
CATCH FOR FISHING SEINES.
No. 343,479. Patented June 8, 1886.
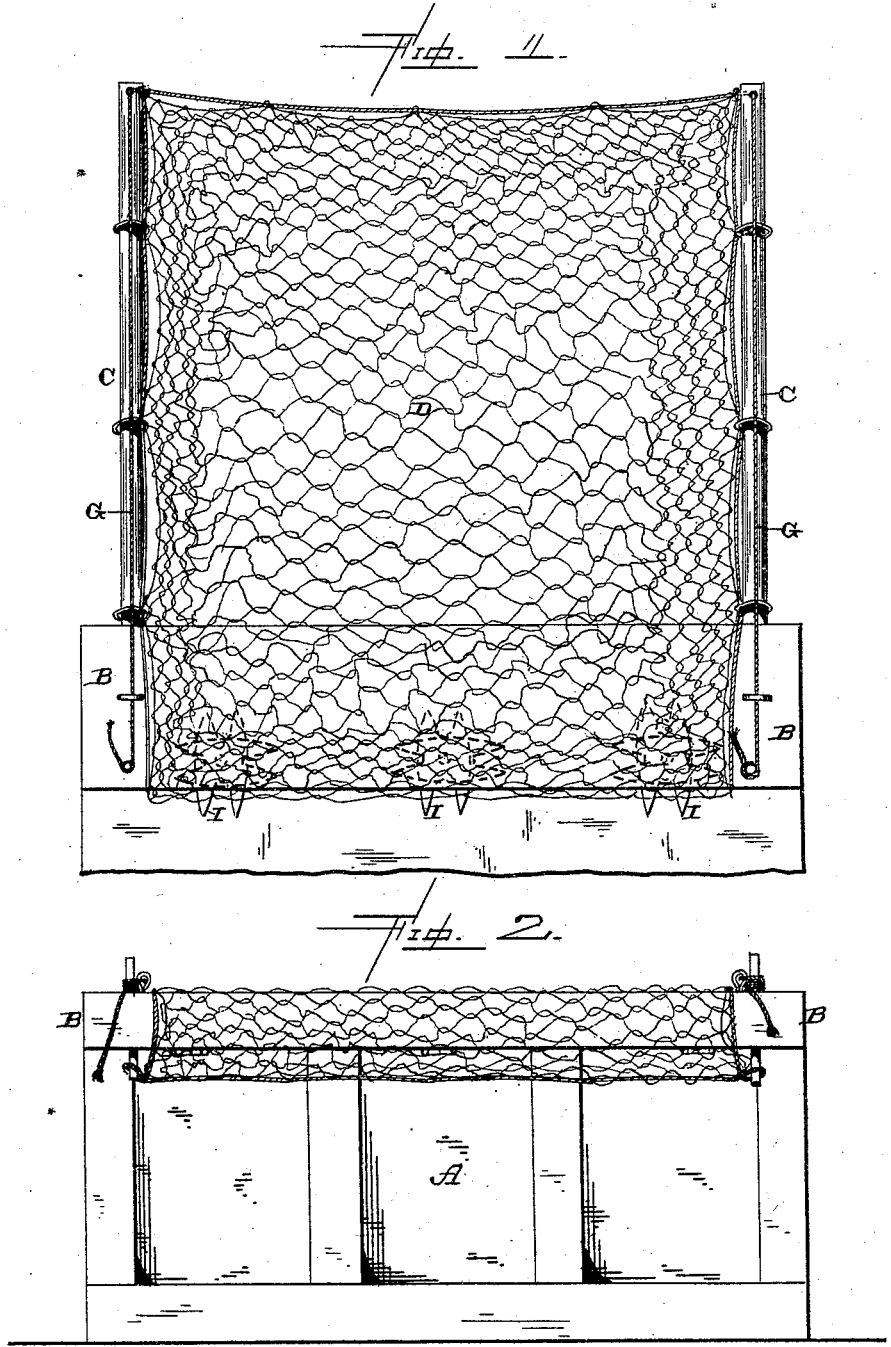

(No Model.) 2 Sheets—Sheet 2.
G. M. McCLAIN.
CATCH FOR FISHING SEINES.

No. 343,479. Patented June 8, 1886.

Witnesses.
L. F. Gardner
A. W. Brecht

Inventor.
Geo. M. McClain,
per
F. A. Lehmann.
Atty.

UNITED STATES PATENT OFFICE.

GEORGE M. McCLAIN, OF ROCKPORT, MASSACHUSETTS.

CATCH FOR FISHING-SEINES.

SPECIFICATION forming part of Letters Patent No. 343,479, dated June 8, 1886.

Application filed March 24, 1886. Serial No. 196,392. (No model.)

*To all whom it may concern:*

Be it known that I, GEORGE M. MCCLAIN, of Rockport, in the county of Essex and State of of Massachusetts, have invented certain new and useful Improvements in Catches for Fishing-Seines; and I do hereby declare the following to be a full, clear, and exact description of the invention, such as will enable others skilled in the art to which it pertains to make and use it, reference being had to the accompanying drawings, which form part of this specification.

My invention relates to an improvement in catches for fishing-seines; and it consists in the combination of the supporting-poles, which extend outward from the side of the vessel, the seine, which is stretched between them, and suitable catches, which are fastened to the under side of the rail of the vessel, for the purpose of having the meshes of the net catch upon them and thus hold the net in any desired position, as will be more fully described hereinafter.

The object of my invention is to provide means whereby the seine can be adjusted into different positions and held wherever adjusted, according to the quantity of the fish held therein.

Figure 1 is a plan view of an apparatus embodying my invention. Fig. 2 is an edge view of the same. Fig. 3 is a detached view of one of the catches. Fig. 4 is a perspective of a seine ready for use.

A represents the side of the vessel, and B the rail, which is secured thereto in the usual manner. In the outer edge of this rail are made suitable openings in which the inner ends of the two supporting-poles C are placed. In between these poles is stretched the seine D, in which the fish are held. This seine is held stretched upon the poles by means of the cords or ropes G, which pass back through suitable guides upon the top of the rail, and are wrapped around pins or other devices prepared to receive them. The seine projects beyond the side of the vessel, supported by the poles C, and holds the fish until the men are ready to clean them. Fastened to the under side of the rail at suitable distances apart are the catches I, of suitable shape, and which are pivoted to the inside of the rail, so that they can be turned back out of the way when no longer needed.

When these catches are to be used, they are turned partially upon their pivots, so that their pronged ends will project outward beyond the inner edges of the rail, and thus enable the meshes of the net to catch freely thereon. As the net is being drawn inward from time to time, holding the fish, the meshes of the net are made to catch over these catches, and thus hold the net in the position into which it has been adjusted. As the supply of fish in the net becomes exhausted it becomes necessary to draw the net nearer into the side of the vessel, and each time that the end is drawn inward it is necessary that the net should be held at its inner end, so as to keep it in the position into which it has been drawn. The object of these catches fastened to the under side of the rail is to have the meshes of the net to catch over them, and thus hold the net at its inner end. Where catches as here shown are not used, it becomes necessary to fasten the inner end of the seine upon the deck, or to hold it by laying weights upon it. These methods are not only troublesome, but when the end of the seine is fastened upon the deck it takes up room and is liable to become injured. These objections are entirely overcome by the catches here shown and described, and which when not in use are turned back out of the way.

Having thus described my invention, I claim—

The combination, with a fishing-vessel provided with the rail B, of the supporting-poles, the seine, and the catches, which are pivoted to the under side of the rail, and upon which the inner end of the seine is made to catch, substantially as shown and described.

In testimony whereof I affix my signature in presence of two witnesses.

GEORGE M. McCLAIN.

Witnesses:
 CYRUS STORY,
 GEORGE W. STORY.